United States Patent
Williams et al.

(10) Patent No.: US 6,671,749 B2
(45) Date of Patent: Dec. 30, 2003

(54) PERIPHERAL DRIVER INSTALLATION METHOD AND SYSTEM

(75) Inventors: Brett Williams, Roseville, CA (US); Richard Kunze, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 366 days.

(21) Appl. No.: 09/801,148

(22) Filed: Mar. 7, 2001

(65) Prior Publication Data

US 2002/0129353 A1 Sep. 12, 2002

(51) Int. Cl.[7] .................................................. G06F 3/00
(52) U.S. Cl. ........................ 710/10; 710/8; 710/62; 710/100; 710/104; 709/321; 709/322; 709/327; 717/176; 717/177; 717/178; 717/174; 717/175
(58) Field of Search ................................ 710/8, 10, 62, 710/100, 104; 717/174–178; 709/321, 322, 327

(56) References Cited

U.S. PATENT DOCUMENTS

| | | | | |
|---|---|---|---|---|
| 5,596,723 A | * | 1/1997 | Romohr | 709/222 |
| 5,630,076 A | * | 5/1997 | Saulpaugh et al. | 709/321 |
| 5,802,365 A | * | 9/1998 | Kathail et al. | 709/321 |
| 5,859,969 A | * | 1/1999 | Oki et al. | 709/200 |
| 5,960,204 A | * | 9/1999 | Yinger et al. | 717/176 |
| 6,038,597 A | * | 3/2000 | Van Wyngarden | 709/219 |
| 6,252,589 B1 | * | 6/2001 | Rettig et al. | 345/703 |

* cited by examiner

*Primary Examiner*—Jeffrey Gaffin
*Assistant Examiner*—Mike Nguyen

(57) ABSTRACT

A method for locating and installing peripheral drivers has steps of creating a driver profile, creating a resources profile, and of looking to potential driver sources on a prioritized list for drivers that match the driver profile. The driver profile may comprise information such as the peripheral model number, the operating system version number, and the operating system language determined through automated queries. The resources profile generally describes the resources available to the operating system in terms of access to the potential driver sources on the list, and may be used to eliminate sources from the list that are not accessible. The remaining sources on the list are checked in descending priority order until a driver matching the driver profile is found. Once a matching driver is found, it is installed on the operating system.

24 Claims, 3 Drawing Sheets

PERIPHERAL DRIVER INSTALLATION METHOD AND SYSTEM

FIELD OF THE INVENTION

The present invention is related to methods for installing computer peripheral drivers. In particular, the present invention is related to methods for automated location and installation of peripheral drivers.

BACKGROUND OF THE INVENTION

Computer peripherals are widely present in the modern computer-saturated world. Printers, scanners, modems, gaming peripherals, external disk drives and the like are used by consumers and businesses in steadily increasing numbers. In order to properly function, these peripheral devices require software drivers. The driver generally provides a software interface that allows software applications running on the computer to functionally interface with the peripheral.

Upon initial purchase a peripheral typically comes with a driver on a disk or other medium for installation by the user. When initially setting up the peripheral, the user is required to install the software driver on his computer's operating system. Different drivers are provided for different computer and operating system configurations. By way of example, different operating system versions may require different drivers.

Additionally, for many peripherals different drivers are required to support different languages and peripheral feature sets. Printers, for instance, may have one driver that supports English, German, and Spanish. For support of Chinese or Japanese, however, a different driver may be required. Likewise, if the user wishes to utilize a special printer math character set, a particular driver may be required. Because the peripheral manufacturer generally does not know in what environment the peripheral will be installed, the manufacturer is often disadvantageously forced to provide multiple drivers with each peripheral thereby adding cost to their products.

Further, users are required to correctly make several determinations to choose the proper driver amongst the several available to install. For example, users must accurately determine factors such as what version operating system they are using, what model peripheral they are installing, what feature sets are supported by the peripheral, and the like. This disadvantageously adds time, effort, and confusion to the installation process. Often, users may make an erroneous determination resulting in the wrong driver being loaded. While this is obviously disadvantageous for the user, it is likewise disadvantageous for the manufacturer as it often leads to increased demands on customer support resources and low customer satisfaction.

Users are also required to maintain all of the supplied drivers in case their computer or network configuration should change in the future. For example, if a computer should crash, the driver may need to be re-installed. As another example, if the user should move the peripheral to a different computer having a different operating system or choose to utilize a special peripheral feature set at some time in the future, they may require a different driver.

Problems associated with finding and installing correct peripheral drivers are even more acute for manufacturers of peripheral servers and other devices designed to work with a plurality of existing peripherals. For these manufacturers, there may be a multiplicity of possible peripherals and associated drivers that will be required. By way of example, devices such as print servers are manufactured and sold to manage many different models of networked printers. It is not practical, and may even be impossible, for the manufacturer of the print server to provide drivers for each of the multiplicity of printers that may be managed by the server. The print server user may therefore be required to find a required driver(s) on her own.

Attempts to address these and other problems in the art have been made. In particular, manufacturers have provided for on-line access to drivers. Users can connect to a driver "library" over a data network such as the Internet to download a desired driver. Unfortunately, this practice still requires users to make a number of determinations in selecting the proper driver. Often a multiplicity of drivers is available from the on-line library, making selection of the proper driver more difficult. The user must also download the driver that is typically in a compressed format to a desired local location, find the downloaded driver, run a decompression algorithm, and then install it. An Internet based driver delivery system thus requires a degree of computer sophistication on the user's part to locate the correct web site and to properly execute the downloading and installation steps.

An additional proposed solution to these unresolved problems involves providing "generic" peripheral drivers with operating systems. These generic drivers in theory can be used with a variety of different peripherals from different manufacturers. While these drivers are relatively easy to find and install as they come pre-packaged with the operating system, they have proven to be problematic in practice. To make them "generically" usable with different peripheral devices, they typically provide only core functionality and may not support some features on a particular peripheral. For this and other reasons use of these generic drivers is often disadvantageous.

The several proposed solutions to these problems have also introduced a new set of problems for driver users. In particular, users are often confronted with multiple choices for obtaining drivers. By way of example, a peripheral user may have drivers available from a CD, a pre-installed operating system location, and an on-line driver library. Each of these locations may have a different driver that will work with the peripheral. Although each of these different drivers is operable, only one will be the most preferred. Some operable drivers, for example, may be old, obsolete versions that have unresolved bugs associated with them or that have only limited functionality.

The plurality of available drivers leads to confusion on the part of the user, who must determine which driver to select. Additionally, the "best" driver may differ for different users depending on their computing environment and criteria for selection. By way of example, some users may only use limited features on the peripheral and thus desire any operable driver. These users may simply desire the driver that is easiest to obtain and install. Other users may require advanced feature functionality and desire the most recently released and robust driver version regardless of the difficulty of obtaining and installation.

These and other problems thus remain heretofore unresolved in the art.

SUMMARY OF THE INVENTION

The present invention generally comprises an improved method for locating and installing a new peripheral driver on an operating system. The method generally comprises the steps of creating a profile of the driver to be installed and searching locations from a list of potential driver sources for a driver that matches the driver profile. Once a matching driver is found, it is downloaded and installed on the operating system. The list of potential locations may be prioritized based on priority standards that may comprise ease of driver installation, most recently released driver version, and the like. The driver profile comprises information that may be reviewed to determine what particular driver is required, and preferably comprises a peripheral model number, an operating system version, and an operating system language.

Preferably, a resources profile is also created that generally describes the resources available to the operating system for obtaining a driver. This resources profile may be evaluated to determine whether any sources from the prioritized list of sources may be eliminated, thereby reducing time and effort associated with the method. The step of creating a resources profile comprises at least determining whether there are any existing drivers currently installed on the operating system, and more preferably further comprises determining a network environment for the operating system.

It will be appreciated that the method of the invention is well suited for practice by a computer in the form of a computer program product. Accordingly, an additional embodiment of the present invention comprises a computer program product comprising computer executable instructions embedded in a computer readable medium that when executed cause a computer to perform the steps of the method of the invention. The computer readable medium preferably comprises data storage media such as magnetic or optical media.

The method and computer program product of the invention thereby solve in a novel and elegant manner many of the heretofore-unresolved problems in the art. Practice of the invention generally allows for automated determination of a user's operating system environment and for subsequent automated procurement of a driver that is best suited to that environment. Practice of the invention also guides users through the confusion associated with multiple potential drivers available from multiple different sources. Additionally, users are not required to accurately make determinations regarding their operating system and peripheral configuration to decide which driver is appropriate. Practice of the invention also greatly reduces the degree of computer and/or networking sophistication that were required of users by prior art methods.

Further, peripheral manufacturers are provided cost savings through practice of the invention as reduced user confusion results in lower demands on customer support resources. Also, shipment of multiple drivers with peripherals may not be required. Instead, drivers may be more efficiently placed in a network accessible central library without concern over a user's ability to locate the library and to choose the correct driver. Updating of drivers is likewise made much easier with this network library configuration.

The above brief description sets forth rather broadly the more important features and advantages of the present disclosure so that the detailed description that follows may be better understood, and so that the present contributions to the art may be better appreciated. There are, of course, additional features of the disclosure that will be described hereinafter that form the subject matter of the claims appended hereto. In this respect, before explaining the embodiment of the disclosure in detail, it is to be understood that the disclosure is not limited to the details set forth in the following description or illustrated in the drawings. The present invention may provide additional embodiments and be practiced in additional ways, as will be appreciated by those skilled in the art. Also, it is to be understood that the phraseology and terminology employed herein are for description and not limitation.

DETAILED DESCRIPTION

Figure 1:
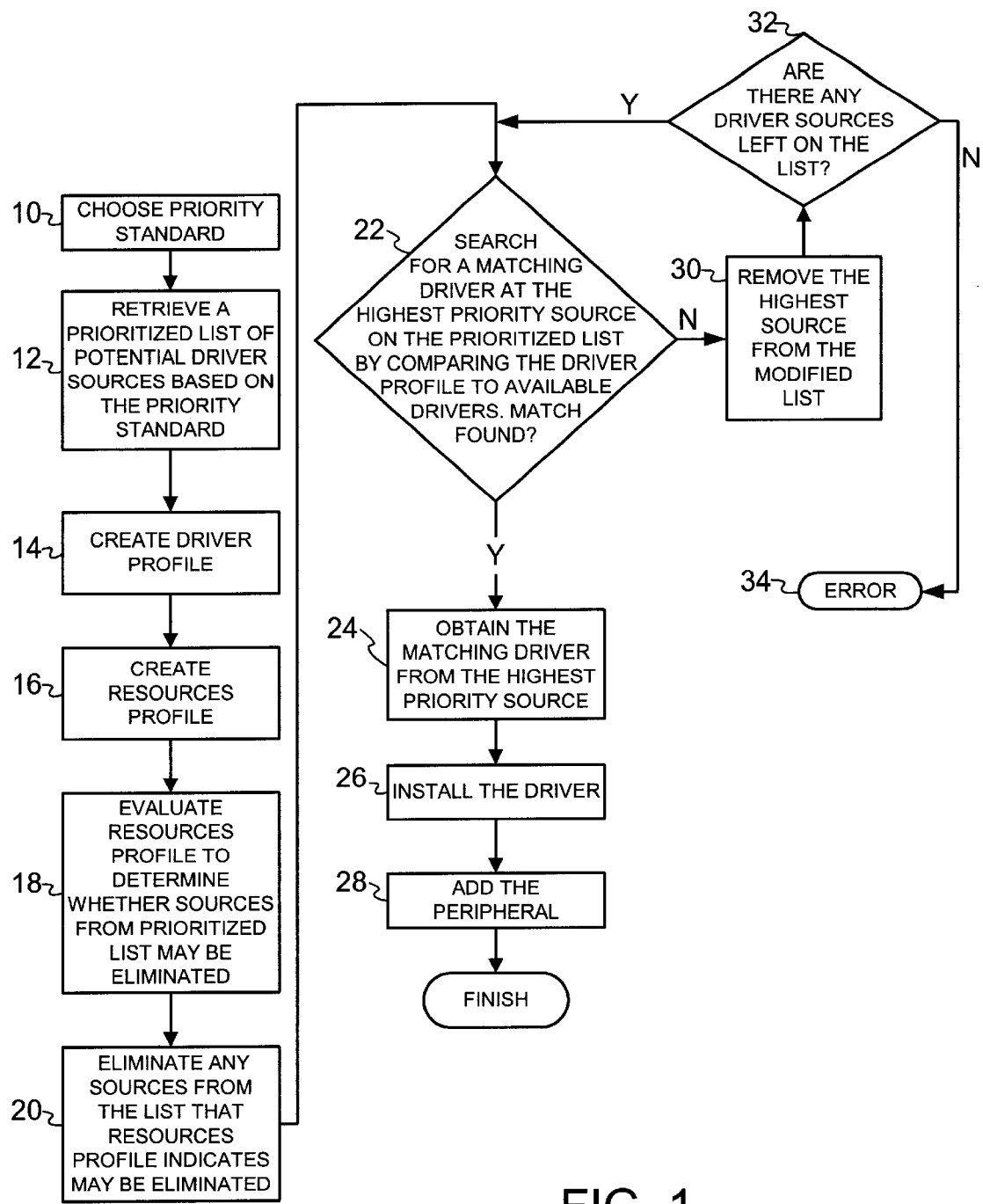
FIG. 1 is a flow chart illustrating a preferred embodiment of the method and computer program product of the invention.

Turning now to the Drawings, FIG. 1 is a flow chart useful in illustration of a preferred embodiment of the method and computer program product of the invention. Initially, a priority standard is selected (block 10) that will be used to rank potential driver sources. By way of example, if a particular user should require only basic peripheral functionality they may desire to have the most easily accessible operable driver installed. In this case "ease of installation" would be selected as a priority standard. As an additional example, if a user should desire that the most robust driver be installed, then a priority standard of "most recent release date" could be selected (assuming that the most recent release date corresponds to a driver that has the highest level of functionality). The priority standard may be chosen through a dialog with the user.

It will thus be appreciated that as used herein, the term "priority standard" is intended to refer to a characteristic or feature upon which drivers and potential driver sources may be ranked. In addition to "ease of installation" and "release date", it will further be appreciated that the invention may be practiced using any of a multiplicity of additional priority standards. Examples include, but are not limited to, manufacturer/programmer of origin, country of origin, degree of certainty regarding virus infection, and the like.

Once a priority standard has been selected, a prioritized list of potential driver sources is retrieved (block 12). Additionally, the method and computer program of the invention may further comprise generating the prioritized list once a priority standard has been selected. That is, as used herein to "retrieve" a prioritized list may comprise generating a prioritized list. The list of sources may be stored on a local data medium, on a remote data medium, on paper, or in other like manners.

The list of driver sources is comprised of a plurality of potential locations for finding drivers. There are at least four preferred sources for obtaining drivers: 1) already installed drivers such as operating system pre-installed generic drivers, 2) sources accessible over a network such as an Internet based driver library, 3) drivers provided by the peripheral manufacturer on portable memory media such as magnetic or optical disks on a disk drive, and 4) drivers "known" to the operating system but not installed, such as generic drivers provided on an operating system reference CD. Other sources in addition to these four of course exist, and may be utilized within the scope of the invention.

A most preferred prioritized list, regardless of selected priority standard, comprises at least a URL address for an Internet based driver library source and a local driver source corresponding to existing installed drivers. Internet based driver libraries are a preferred source as they are widely available, and as they may be regularly updated to contain the most recently released drivers by the peripheral manufacturer. Other prioritized lists may of course comprise additional source listings, such as a phone number and password to use for dial up access to a network and driver library.

The ranking of these and other potential sources on the prioritized list of the invention may vary depending on the chosen priority standard. It will be appreciated that multiple lists having the same sources thereon are possible within the invention, with the prioritized order of these sources depending on the priority standard selected.

In order to properly identify and obtain a driver from one of the sources on the prioritized list, the method and program product of the invention will create a summary profile of the user's new peripheral and operating system environment. This summary will be accomplished through creation of two files: a driver profile file (block 14) and a resources profile (block 16).

Figure 2:
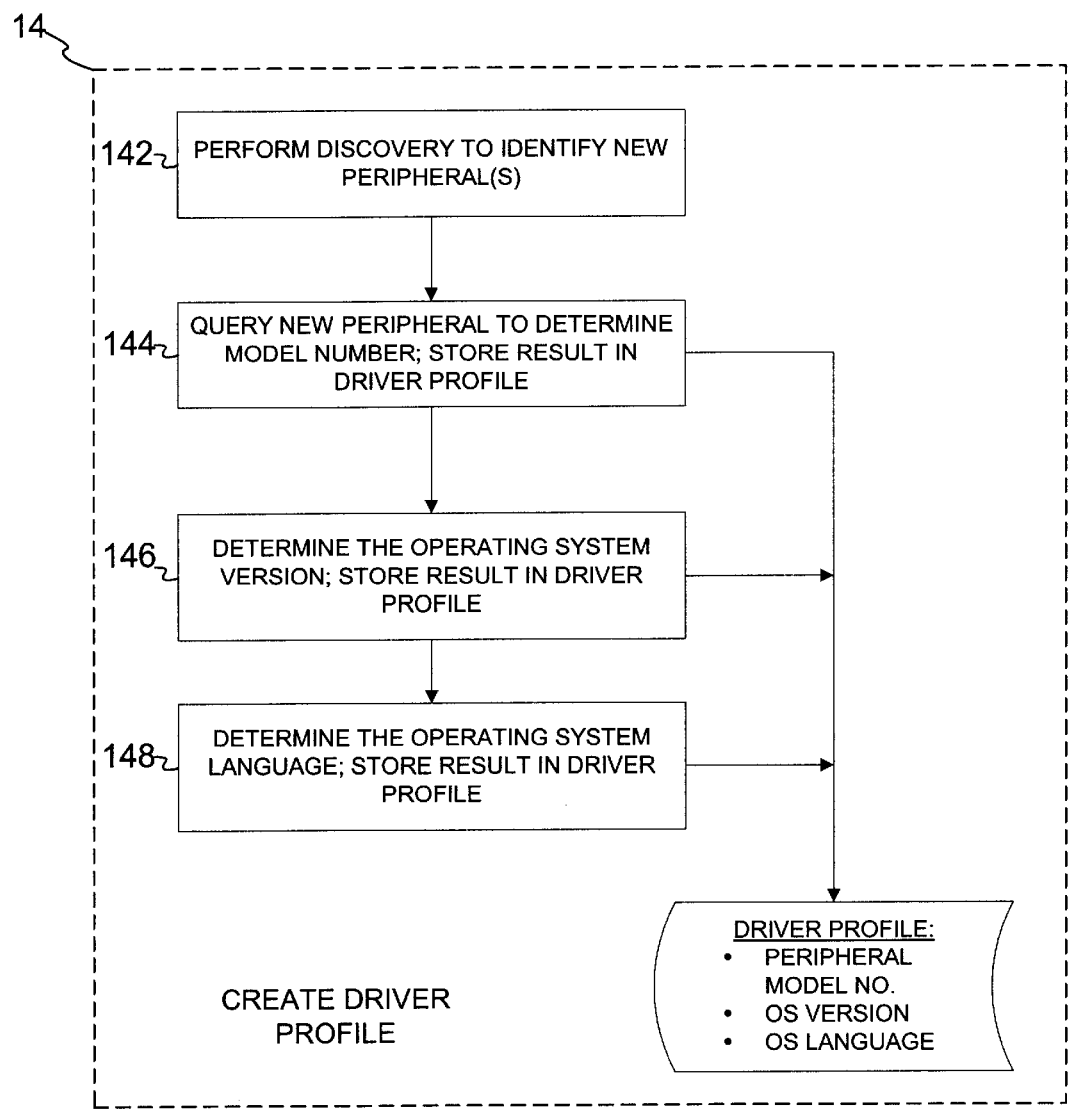
FIG. 2 is a flow chart illustrating in greater detail a step of the flow chart of FIG. 1.

The preferred driver profile will provide two general categories of information useful for making a driver selection: 1) information regarding the peripheral, and 2) information regarding the user's operating system. FIG. 2 is a flow chart illustrating a preferred subset of steps performed in creating the driver profile within the method and computer program embodiment illustrated in FIG. 1. Initially, a discovery is performed to identify a new peripheral connected to the operating system (block 142).

This discovery performed to identify the peripheral is preferably accomplished through use of operating system utilities present in most operating systems for such purposes. These utilities may be used to determine peripheral information that at least comprises a peripheral model number (block 144). If the peripheral is connected to the operating system via a network, identification of the peripheral preferably occurs by a query made in a network management protocol such as SNMP (Simple Network Management Protocol) to communicate with an information database provided with the peripheral, such as an SNMP MIB (Management Information Base). SNMP and similar network management protocol formats are preferred as many peripheral manufacturers provide their peripherals with pre-loaded information in a like format for reporting.

The peripheral is preferably identified by data that comprises at least a model number recognizable to the manufacturer. A model number is preferred as it is the most commonly referenced data for choosing a driver. That is, if a peripheral model number is known, a suitable driver may be identified. Information in addition to a model number may also be obtained via the identification step, with example additional information comprising a peripheral serial number, date of manufacture, performance specifications, supported features, and the like. In particular, peripheral information such as supported features can be useful for choosing a suitable driver. By way of example, a printer that supports English and French may require a different driver than for the same printer that only supports English.

In addition to peripheral information, the driver profile preferably comprises information describing the user's operating system that will be of use in selecting the proper driver. Accordingly, in creating the preferred driver profile the operating system version is determined (block 146), and the operating system language is determined (block 148). As will be appreciated by those knowledgeable in the art, this data can generally be obtained by a call to a utility provided in most operating systems for reporting such information.

It will be understood that the term "operating system version" as used herein may comprise information in addition to a particular version number, and may also comprise an operating system type. By way of example, an "operating system version" as used herein may comprise "Windows NT 2000 1.1.1", "UNIX Version 11.1.1 2001", "OS 6.9", and the like. The operating system language refers to the language for operation, such as English, Spanish, German, and the like. Additional information regarding the operating system may of course be comprised in the driver profile of the invention, including by way of example and not limitation any particular operating system function sets enabled such as speech recognition, handicapped feature sets, and the like.

Before using the driver profile to choose an appropriate driver from one of the driver sources on the prioritized list, the driver resources available from the user's operating system will be evaluated. Accordingly, a resources profile is created (FIG. 1, block 16). The flow chart of FIG. 3 describes a preferred subset of steps for creating a resources profile of the method and computer program invention embodiment illustrated in FIG. 1. As most operating systems come with pre-installed "generic" drivers, this is a preferred source for inclusion on the prioritized list. In creating the preferred resource profile, therefore, a determination is made regarding the existence of any currently installed drivers on the operating system (block 162). Preferably, the types of installed drivers in reference to the type of new peripheral is further determined. That is, if the new peripheral has been identified as a printer, then the operating system will preferably be queried to determine whether any printer drivers are installed thereon.

This determination is preferably accomplished by a call to a utility provided with most operating systems. In particular, those knowledgeable in the art will appreciate that determining the existence and identity of drivers installed on an operating system can be accomplished in a relatively straightforward manner. By way of example, command syntax of "EnumPrinterDrivers" can be made to an application programming interface layer of Microsoft's Windows operating systems to identify printer drivers installed thereon. Those knowledgeable in the art will appreciate that other operating systems have similar accessible functionality.

Network accessible driver libraries are a second common source for obtaining drivers that are on the preferred prioritized list. An additional preferred step of creating a resources profile thereby comprises determining whether network connectivity exists. The most preferred network connection comprises Internet connectivity, as the ubiquitous presence of the Internet makes it a widely accessible medium that is very effective for hosting driver libraries. In creating the most preferred resources profile of the invention, then, network connectivity refers to Internet connectivity. Internet connectivity is preferably determined by the status of the operating system's Internet protocol ("IP") stack. In particular, if the IP stack is enabled, it is assumed that Internet connectivity exists. Other determinations regarding network connectivity may likewise be carried out within the invention, included but not limited to querying the user, pinging a known internet address, and determining whether dial-up connectivity exists.

In addition to determining IP stack enablement, the method of the invention may comprise an additional step of determining whether any security measures limit or prevent access to the Internet. That is, it is anticipated that the invention will be practiced by users that may have so-called firewalls or other security measures set up to protect their computer or internal network from intrusion over the Internet or other external networks. It will therefore be appreciated that as used herein the term "firewall" is intended to refer to software and other security measures for selectively allowing network access. An additional embodiment of the invention will comprise an additional step of determining whether any such firewalls are in place that prevent network connectivity.

In addition to the preferred Internet, the resources profile may indicate the existence of network connectivity to other networks. In particular, a potential driver source within the practice of the invention may comprise a driver library maintained on a LAN or WAN that is purely "internal". By way of example, a large corporation having a multiplicity of printers distributed about an extensive WAN may maintain a central printer driver library on the WAN. Such a central library may prove efficient in practice as the corporate user will have the advantage of providing an easily accessible central location for obtaining drivers, and will be able to maintain control over what drivers are used within the corporation. Additionally, risks associated with obtaining drivers from external sources such as the Internet are avoided.

The resources profile may of course determine the availability of other resources in addition to already installed drivers and network connectivity. An additional source that may be comprised within a prioritized list of the invention may comprise a reference disk such as an optical or magnetic data storage disk that is provided with a peripheral, with an operating system, or from other sources. The existence of such a reference disk may be determined through one or more additional steps of additional embodiments of the invention. A first additional invention step may comprise performing a query to the operating system to identify drivers that the operating system may know of but are not installed. The Windows operating system, for example, may be provided with reference drivers located on a storage medium such as a CD disk that are not installed during a "standard" operating system installation. The query to the operating system may thus indicate that although not installed the generic drivers are known of and are available on the reference CD disk.

An additional invention embodiment may comprise the step of performing a dialog with a user to identify external data storage devices such as CD's containing peripheral drivers. By way of example, a dialog with the user may be performed to determine if any disks are available that were provided with the peripheral, with the operating system, or the like. The dialog may further prompt the user to load the disk if it exists on a disk drive. Further, the invention may comprise actually querying local drives for drivers without a user dialog. In particular, the invention may look for driver files or directory names expected to contain drivers on disks that were provided by the peripheral manufacturer.

After creation, the resources profile is evaluated to determine whether any driver sources from the prioritized list may be eliminated (block 18). That is, should the resources profile indicate that some sources are not available, these sources will be eliminated from the prioritized list (block 20). By way of example, should the resources profile indicate that no existing drivers are installed on the operating system, the installed driver source would be eliminated from the prioritized list. Likewise, if the resources profile indicates that the IP stack is not enabled or that an impenetrable firewall exists, an Internet driver source would be eliminated from the list. If a query to the user and/or the operating system does not identify any potential driver sources contained on a CD or other storage medium, corresponding sources can be eliminated.

Once sources from the prioritized list have been eliminated based on a review of the resources profile, the sources remaining on the list may be searched for a suitable driver. Preferably, the highest priority source on the list is queried to determine if it has a driver that matches the driver profile (block 22). If no matching drivers are identified at a source on the list, the source is removed from the list (block 30), and the next highest priority source is checked for a driver matching the driver profile (blocks 32, 22). These steps are repeated until a matching driver is finally located. In checking the sources from the prioritized list, the possibility of course exists that none of the sources on the list have a driver that matches the driver profile. In this case an error indicator results (block 34).

When querying a source from the list, matching drivers may be identified by referencing the driver profile and comparing information therein to the driver files at the source. It is noted that the invention is preferably practiced in a "manufacturer specific" manner. That is, the invention is preferably practiced to find drivers available from a manufacturer to drive that manufacturer's peripheral. This is advantageous when searching for matching drivers as the naming convention of those drivers is known, and may be used to identify drivers and directories containing drivers.

By way of example, many peripheral manufacturers incorporate supported peripheral model numbers in corresponding driver filenames. The Hewlett Packard Co. of Palo Alto, Calif., ("HP") for instance, has a character string in the filename of HP drivers that matches the model number of supported HP printers. Other information regarding the driver, such as supported operating systems and feature sets may be included in the filenames. Under these circumstances, the peripheral model number is preferably compared to the filenames of the drivers to determine if the driver matches.

Other methods for identifying matching drivers may of course be comprised within practice of the present invention. As a second example, an additional embodiment of the invention comprises the step of consulting with a reference table that cross-references peripheral model numbers with driver file names. The table may additionally cross reference other information, such as operating system versions supported, operating system languages supported, feature sets supported, and the like. The reference table may be located in any of many different locations, but is preferably located at a network accessible location such as an Internet web site so that it may be continually updated. Within this invention embodiment, then, once the peripheral model number is known the website table may be referenced to determine suitable driver filenames.

A third example of identifying matching drivers comprises querying a potential driver filename for supported peripherals. The driver file, or a file provided with the driver, may contain information indicating what peripherals are supported. In particular, those knowledgeable in the art will appreciate that drivers are often accompanied with "information" files providing useful information for using the driver file. These information files may be provided with a filename having a ".INF", a ".TXT", or other widely recognized identifying extension. By way of example, a driver file may have a file name of HP4C3.EXE and be accompanied by a HP4C3.INF file. The HP4C3.INF file may contain information useful for using the HP4C3.EXE driver, such as supported peripherals, date of release, author, and the like. Accordingly, an additional embodiment of the present invention will comprise the additional step of querying a file for information regarding supported peripherals.

When a matching driver is located from one of the sources on the list, the matching driver will be obtained from the matching source (block 24) and will be installed on the operating system (block 26). Often driver files are provided in compressed format for considerations of ease of downloading. Installation of the driver may therefore comprise first de-compressing the driver file, and then running an executable for actual driver installation. These steps may comprise performing a dialog with the user that may determine, for example, where the driver is to be installed on the operating system.

Preferably, the method and program of the invention further comprise adding the peripheral to the operating system (block 28). As will be appreciated by those knowledgeable in the art, to "add" a peripheral to an operating system comprises "connecting" the peripheral to the driver so that the operating system may locate and functionality communicate with the peripheral. This invention embodiment therefore comprises creating a driver profile (block 14) that further comprises peripheral location data.

In particular, a unique location for the peripheral may be discovered in a format that will allow the operating system to locate the peripheral for communication. The location may comprise a port number for a locally connected printer, with examples comprising a USB port, a COM port, or an LPT port. A unique network location for a peripheral connected to the operating system over a network may comprise an address such as a MAC (Media Access Control), a DLC (Data Link Control) address, or the like. To use the peripheral, a "name" for the peripheral is also generally required so that the user will be able to reference the peripheral. Thus, the invention may comprise the additional step of performing a dialog with the user for choosing a peripheral name. Through these preferred steps the peripheral can be added to the operating system. Once added, the peripheral will have a name that identifies the peripheral to the user, and will be functionally linked with its driver so that applications running on the operating system may communicate with it.

It will be appreciated that the present invention lends itself well to practice in the form of a computer program product. Accordingly, an additional embodiment of the invention comprises a computer program product for installing a peripheral driver on a computer operating system, the computer program product comprising a computer usable medium having computer readable program code embodied in the medium that when executed causes a computer to perform the steps of the method of the invention. The computer usable medium may comprise data storage media such as circuitry chip sets, and magnetic or optical media. Preferred examples comprise magnetic data storage disks, optical data storage disks, and circuitry embedded on chips or cards.

Figure 3:
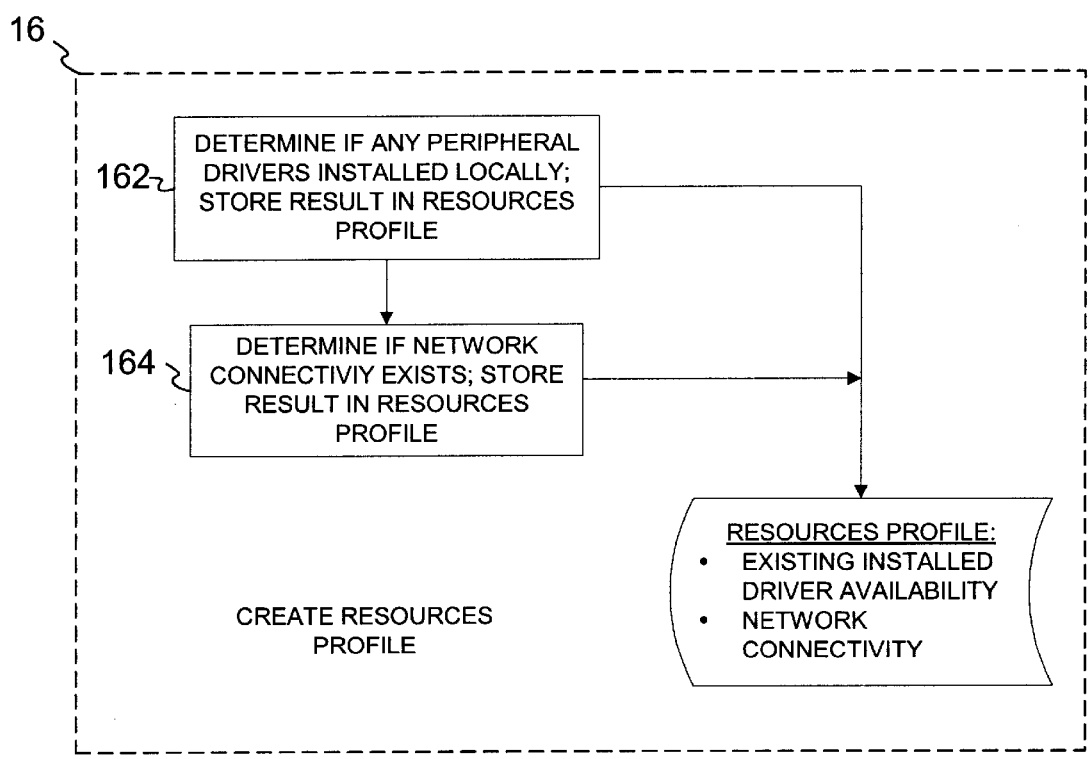
FIG. 3 is a flow chart illustrating in greater detail a step of the flow chart of FIG. 1.

By way of further description of the method and computer program of the present invention, an example of the practice of the invention is offered with reference again made to the flow charts of FIGS. 1–3. In this example embodiment, the invention comprises a computer program product comprising computer executable instructions embedded on a CD for locating and installing a driver for a printer manufactured by the Acme Corp., and having a model number of 300ZX. When placed on a computer and prompted for execution by a user, the computer program product first causes the computer to perform a dialog with the user to select a priority standard (block 10).

Selection of a priority standard (block 10) such as most recent release date will determine which prioritized list of sources is retrieved (block 12). The example prioritized list will have the highest priority source comprising a URL address corresponding to the Acme Corp. driver library website. This is the preferred highest priority website under the most recent release date priority standard as it may be easily updated by the Acme Corp., and therefore has a greater chance of containing the most recently released driver than do other sources such as operating system generic drivers or drivers on a printer disk.

For the present example, the prioritized list retrieved will comprise:

Example Prioritized List:
1) http://www.acmedriver.com/
2) Acme driver CD
3) Currently installed printer driver on the operating system
4) Generic printer driver on operating system reference disk A driver profile is then created (block 14) that will contain information useful for selection of the proper driver. Creation of the driver profile first comprises causing the computer to query the operating system to identify and locate newly connected peripherals (block 142). The operating system will respond to this query by identifying the newly connected ZX300 printer along with location information such as a port number. Having identified the new printer, the program product of the invention will proceed to query the printer for information that comprises at least a model number (block 144), and more preferably comprises additional information such as supported feature sets. For the present example embodiment, a model number data string of "ZX300" is obtained, along with an indication that the printer supports printing of an advanced math character set.

The computer program product then causes the computer to query the operating system for an operating system version (block 146) and language (block 148). For the present hypothetical example, data comprising a version of Windows NT 2000 2.1.2 and English, respectively, are returned. Thus, the driver profile created by the present program product example comprises a printer model number of ZX300, an indication that the printer supports an advanced math character set, an indication that the operating system version is Windows NT 2000 2.1.1, and an indication that the operating system language is English.

A resources profile will next be created (block 16) through steps that comprise first causing the computer to determine if any existing drivers are installed on the operating system (block 162) through an "enum printer driver" query to a layer of the operating system. For our example, a response indicating that no printer drivers are installed is returned. The program product next causes the computer to determine if network connectivity exists from the operating system (block 164). This preferably occurs by determining whether 1) an IP stack has been enabled on the operating system, and 2) determining whether any security devices such as a firewall exist that will prevent Internet access. For the present example, the resources profile indicates that an IP stack has been enabled, and that no security devices preventing network access exist.

Preferably, the program product further causes the computer to perform a dialog with the user to determine if other resources such as an Acme driver disk or an operating system reference disk are available. In the present example, this dialog results in the user indicating that an external driver CD for the printer is available, but that no external operating system driver disk is available.

Thus, for this example driver location and installation, the resource profile created by the computer program of the invention indicates that: 1) no currently installed drivers exist on the operating system, 2) Internet connectivity exists, 3) an external printer driver disk is available, and 4) no external operating system driver disk is available. When the computer program product evaluates this resources profile (block 18), it will conclude that the currently installed printer source and the generic printer driver on the operating system reference disk source can be eliminated (block 20) from the prioritized source list. The example list is thereby left with only two sources, the URL source and the Acme driver CD source.

The program product will then cause the computer to check these sources in descending priority order for a driver that matches the driver profile (block 22). The highest priority source is the URL source. Thus the program product causes the computer to access the Acme driver library over the Internet to look for a driver that matches the driver profile. The Acme driver website may have a table that cross references printer model numbers, operating system versions, operating system languages, feature sets, and the like with driver filenames. In this case, the program product would cause the computer to query this reference table, with the result that a driver filename is obtained that is the most recently released driver that supports the advanced math character feature set, and that runs on Windows NT 2000/English.

Should no driver matching the driver profile have been found on the Acme library website, this source would have been removed from the list (block 30), and the program product would have proceeded to the next source on the list in descending priority (block 32). Thus, in our example the program product would cause the computer to check the Acme driver disk for a driver matching the driver profile. This process may comprise conducting a dialog with the user that directs the user to insert the Acme disk on a disk drive and indicate to the computer when the disk is accessible. The checking of the disk may comprise consulting a reference table as described above, or may comprise other query methods. Also, the invention may comprise storing the resulting driver file name obtained through reference to the web site table.

Also, the computer may be caused to simply look for a driver file on the Acme disk with the character string "ZX300" in its name. By way of additional example the matching driver filename may have a coded character string filename or attachment that indicates it will run on Windows NT 2000/English, and that it will support the math character set. By way of still additional query method example, a driver file may have discoverable information file associated with it that the computer may query to determine whether the particular driver matches the driver profile.

Assuming that this example embodiment located the matching driver on the Acme website, the program product next causes the computer to download the matching driver from the website (block 24). The matching driver may be downloaded in a self-installing compressed executable format for efficiency of downloading. Installation of the driver (block 26) occurs when the program product causes the computer to run the self-installing executable driver program, which first de-compresses itself and then begins the installation process. Installation may comprise conducting a dialog with the user to determine such things as what directory or folder to place the driver in and the like.

Once installed, the program product preferably further causes the computer to add the printer. As will be appreciated by those knowledgeable in the art, the term "add" as used in this context refers to the process of functionally enabling the printer for use on the operating system. This process may comprise functionally linking the driver to the printer, providing a computer accessible address for the printer, and giving the printer a user selectable name. Thus the adding process may comprise providing printer location data, such as a port number or network MAC address that is contained in the driver profile. This adding process may comprise conducting a dialog with the user to determine a printer name and the like.

The method and computer program product of the invention thereby solve many of the heretofore-unresolved problems in the art in an elegant and novel fashion. In particular, the invention provides an automated tool for locating and installing peripheral drivers from a plurality of potential sources. This significantly reduces the confusion associated with methods of the prior art. Practice of the present invention also does not require the advanced computer and/or networking skills that were often required for practice of methods of the prior art. In addition to improvements over prior art methods achieved for the benefit of users, practice of the present invention also provides benefits to peripheral manufacturers. The need to provide multiple drivers with peripherals to accommodate the many possible operating environments is eliminated. Likewise, demands on customer service are decreased as a result of decreased customer confusion.

Those knowledgeable in the art will appreciate that the embodiments invention described herein are examples only, and that many other variations of the invention as claimed are possible. By way of example, the order of the steps of the method and program product actions as described herein is not exclusive. It will be readily appreciated, for example, that the order of creating a driver profile, a resources profile, and of retrieving a prioritized source list may be varied within the scope of the invention as claimed.

In addition, it will be understood that although various information has been gathered and placed into sets such as the "resource profile" and "driver profile", these information sets should not be interpreted to limit the scope of the invention as claimed. Many additional mechanisms in addition to a "resource profile" or "driver profile" may be used in the practice of the invention. The invention could be practiced, for instance, by using information directly as it is gathered without placing it into intermediary "profiles" as described. Further, required information could be placed into a single "profile" set, or into a plurality of "profile" sets in addition to those described. It will be appreciated that these variations of the invention as described herein are merely trivial alterations, and are functionally equivalent to practice as described and claimed. The use of a driver and a resource profile is preferred and has been described herein as it has been found to summarize the invention in a more organized and easily understood manner.

Further, it will be appreciated that the present invention is capable of practice with a list of sources that is not prioritized. That is, the present invention could comprise comparing a driver profile to a list of sources that is not organized in consideration of any priority standard, but may instead be assembled in a random order. It will be appreciated that the method of the invention practiced with such a randomly assembled source list could nonetheless result in the location of a matching driver. A prioritized list is preferred, however, as it tends to speed the location of a matching driver.

Also, still another embodiment of the invention comprises identifying drivers that do not match the driver profile exactly, but that may be used with the peripheral. This may be of utility, for example, if a driver exactly matching the driver profile data cannot be located. A "second choice" driver that will function but offer a more limited feature set could then be selected for installation. By way of example, upon determining that no exactly matching driver is available from any of the sources on the list, the invention may comprise re-searching the sources for the best second choice driver that while not an exact match will provide functionality.

Those knowledgeable in the art will also appreciate that several variations on the steps of searching through the prioritized list for a matching driver are conceivable within the scope of the invention as claimed. By way of example, a so-called "bubble sort" routine may be used to search through the prioritized list. With this routine, a driver that most closely matches the driver profile would be selected from the first source on the list, even if the driver did not exactly match the driver profile. The driver from the second source on the list that most closely matched the driver profile would then be compared with the driver selected from the first source. The closest match to the driver profile from between these two drivers would then be saved, and subsequently compared with the closest matching driver from the third source.

In this manner, a running comparison is performed that keeps the best choice as the "matching driver" until a better choice is located as sources are searched in descending order down the prioritized list. While this bubble sort method may locate a driver that exactly matches the driver profile, it may also be useful for finding a driver that will be functional, although not an exact match to the driver profile data. Other sorting methods as are generally known may of course likewise be used within practice of various embodiments of the invention.

It will also be noted that although a few examples of computer peripherals have been offered herein, the term "peripheral" is intended to have its widest possible meaning, and is intended to generally refer to any machine capable of attachment to a computer for operation through manipulation by that computer. In addition to examples such as printers, scanners, gaming pieces, and external disk drives, other examples of peripherals as used herein include, but are not limited to, machine tools and communication devices such as facsimile machines, telephones, and the like.

Still other variations of the invention as claimed are of course possible and will be apparent to those knowledgeable in the art. It is intended that the specific embodiments and configurations herein disclosed are illustrative of the preferred and best modes for practicing the invention only, and should not be interpreted as limitations on the scope of the invention as defined by the appended claims.

Various features of the invention are set forth in the appended claims.

What is claimed is:

1. A method for installing a new peripheral driver on a computer operating system, the method comprising the steps of:

querying a user to determine a priority standard;

using said priority standard to prioritize a plurality of driver sources into a prioritized list of sources;

creating a driver profile for the new peripheral comprising at least a new peripheral model number;

searching sources from said prioritized list for a driver matching said driver profile by proceeding along said list in descending priority until a matching source is found having a driver matching said driver profile;

obtaining said matching driver from said matching source; and, installing said matching driver on the operating system.

2. A method for installing a new peripheral driver on a computer operating system as defined by claim 1 wherein said method further comprises the steps of:

creating a resources profile for the operating system;

evaluating said resources profile to determine whether any of said sources from said prioritized list of sources may be eliminated; and, eliminating said sources that may be eliminated from said prioritized list prior to said step of searching said sources for a driver matching said driver profile.

3. A method for installing a new peripheral driver on a computer operating system as defined by claim 2 wherein said step of creating a resources profile for the operating system further comprises determining whether network connectivity exists from the operating system.

4. A method as defined by claim 3 wherein said step of determining whether network connectivity exists comprises determining whether an Internet protocol stack has been enabled on the operating system.

5. A method as defined by claim 2 wherein said step of creating a resources profile for the operating system comprises determining the existence of any installed peripheral drivers on the operating system.

6. A method as defined by claim 1 wherein said prioritized list of sources comprises at least an existing driver source and a network source, and wherein the method further comprises the steps of:

creating a resources profile comprising an indication of the presence of any existing drivers installed on the operating system and an indication of the existence of network connectivity;

eliminating said existing driver source from said list if said resource profile indicates that no existing installed drivers exist; and, eliminating said network source from said list if said resource profile indicates that no network connectivity exists.

7. A method for installing a new peripheral driver on a computer operating system as defined by claim 1 wherein said prioritized list of potential driver sources comprises at least a URL address for an Internet driver library.

8. A method for installing a new peripheral driver on a computer operating system as defined by claim 1 wherein said step of creating a driver profile further comprises determining an operating system version.

9. A method for installing a new peripheral driver on a computer operating system as defined by claim 1 wherein said step of creating a driver profile further comprises determining an operating system language through a call to an operating system utility.

10. A method as defined by claim 1 wherein the step of querying a user to determine a priority standard includes providing a plurality of priority standards to the user, and wherein said determined priority standard comprises a priority standard selected by the user from said plurality of priority standards.

11. A method as defined by claim 10 wherein said plurality of priority standards include at least ease of installation, manufacturer of origin, programmer of origin, degree of certainty regarding virus infection, and release date.

12. A computer program product for installing a new peripheral driver on a computer operating system, the computer program product comprising a computer usable medium having computer readable program code embodied in the medium that when executed causes a computer to:

conduct a dialog with a user to determine a priority standard;

retrieve a list of potential driver sources and prioritize said list using said priority standard;

create a driver profile for the new peripheral comprising at least a new peripheral model number;

search sources from said list of sources for a driver matching said driver profile;

obtain said matching driver; and, install said matching driver on the operating system.

13. A computer program product for installing a new peripheral driver on a computer operating system as defined by claim 12 wherein when executed the computer program product further causes the computer to:

create a resources profile for the operating system;

evaluate the resources profile to determine whether any sources from said list of sources may be eliminated; and eliminate said sources that may be eliminated from said list prior to checking said sources for a driver matching said driver profile.

14. A computer program product as defined by claim 13 wherein said resources profile comprises at least an indication of the existence of any currently installed drivers on the operating system, and of the existence of network connectivity to the operating system.

15. A computer program product as defined by claim 14 wherein said resources profile indicates that network connectivity does not exist if it is determined that a firewall prevents access to a network from the operating system.

16. A computer program product as defined by claim 12 wherein said list comprises at least an existing driver source and a network driver source, and wherein the program product instructions when executed further cause the computer to:

create a resources profile by determining at least whether any installed drivers on the operating system exist and whether network connectivity from the operating system exists;

eliminate said existing driver source from said list if said resources profile indicates that no installed drivers exist; and, eliminate said network source from said list if said resource profile indicates that no network connectivity exists.

17. A computer program product as defined by claim 12 wherein said list of potential driver sources comprises at least a URL address for an Internet based driver library.

18. A computer program product as defined by claim 12 wherein causing the computer to create a driver profile further comprises causing the computer to determine a version and a language for the operating system through one or more calls to one or more operating system utilities.

19. A computer program product as defined by claim 12 wherein the program instructions when causing the computer to conduct a dialog with a user to determine a priority standard cause the computer to provide a plurality of priority standards that include at least ease of use, and wherein said determined priority standard comprises a priority standard selected from said plurality of priority standards.

20. A computer program product as defined by claim 12 wherein the program instructions when causing the computer to retrieve a list of potential driver sources queries the operating system to identify drivers that are known to the operating system but are not installed on the computer, and to direct a user to load a disk containing said known but un-installed drivers on the computer.

21. A computer program product as defined by claim 12 wherein the program instructions when executed further cause the computer to communicate over a network with a reference table stored remotely from the computer, said reference table containing data that includes at least peripheral model numbers cross-referenced with driver file names.

22. A computer program product for installing a new peripheral driver on a computer operating system, the computer program product comprising a computer usable medium having computer readable program code embodied in the medium that when executed causes a computer to:

perform a dialog with a user to determine a user selected priority standard;

generate a prioritized list of potential driver sources using said user selected priority standard, said list comprising at least an installed driver source and a network driver source;

discover the operating system language and version;

create a driver profile for the new peripheral comprising at least a new peripheral model number, said operating system version, and said operating system language;

create a resources profile for the operating system, said resources profile comprising an indication of the existence of any installed peripheral drivers on the operating system and an indication of the operating system network connectivity;

eliminate said installed driver source from said prioritized list if said resources profile indicates that no installed drivers exist;

eliminate said network driver source from said prioritized list if said resources profile indicates that no network connectivity exists;

search sources from said prioritized list for a driver matching said driver profile by proceeding along said list in descending priority order until a matching source is found having a driver that matches said driver profile;

obtain said matching driver from said matching location; and, install said matching driver on the operating system.

23. A computer program product as in claim 22, wherein said network driver source comprises a URL address for an Internet driver library, and wherein said resources profile indicates that network connectivity exists if an IP stack is enabled on said operating system.

24. A method for installing a new peripheral driver on a computer operating system, the method comprising the steps of:

determining one user selected priority standard from a plurality of priority standards;

using said user selected priority standard to prioritize a list of potential driver sources comprising at least a network driver source and an existing driver source;

creating a driver profile for the new peripheral, said driver profile comprising at least a new peripheral model number, an operating system version, and an operating system language;

creating a resources profile for the operating system, said resources profile comprising an indication of the existence of any installed peripheral drivers on the operating system and an indication of the network connectivity of the operating system;

eliminating said network driver source from said prioritized list if said resources profile indicates that no network connectivity exists;

eliminating said existing driver source from said prioritized list if said resources profile indicates that no installed drivers exist;

searching sources from said prioritized list for a driver matching said driver profile in descending priority order until a matching source is found having a driver matching said driver profile;

obtaining said matching driver from said matching source; and, installing said matching driver on the operating system.

\* \* \* \* \*